US008754882B2

(12) United States Patent
Maekawa et al.

(10) Patent No.: US 8,754,882 B2
(45) Date of Patent: Jun. 17, 2014

(54) PIXEL CIRCUIT, DISPLAY DEVICE, AND INSPECTION METHOD

(75) Inventors: Yuichi Maekawa, Shagamihara (JP); Koichi Miwa, Yokohama (JP)

(73) Assignee: Global OLED Technology LLC, Herndon, VA (US)

( * ) Notice: Subject to any disclaimer, the term of this patent is extended or adjusted under 35 U.S.C. 154(b) by 166 days.

(21) Appl. No.: 13/508,713

(22) PCT Filed: Nov. 4, 2010

(86) PCT No.: PCT/US2010/055368
§ 371 (c)(1),
(2), (4) Date: Oct. 5, 2012

(87) PCT Pub. No.: WO2011/059867
PCT Pub. Date: May 19, 2011

(65) Prior Publication Data
US 2013/0016083 A1 Jan. 17, 2013

(30) Foreign Application Priority Data
Nov. 10, 2009 (JP) ................................ 2009-257527

(51) Int. Cl.
*G06F 3/038* (2013.01)
*G09G 5/00* (2006.01)

(52) U.S. Cl.
USPC ............. 345/211; 345/87; 345/92; 315/169.1

(58) Field of Classification Search
USPC .................................. 345/87–100, 211–213; 315/169.1–169.4
See application file for complete search history.

(56) References Cited

U.S. PATENT DOCUMENTS

| | | | | |
|---|---|---|---|---|
| 6,611,107 | B2 * | 8/2003 | Mikami et al. | 315/169.1 |
| 6,771,028 | B1 | 8/2004 | Winters | |
| 7,265,572 | B2 | 9/2007 | Osada | |
| 2004/0100203 | A1 * | 5/2004 | Kobayashi et al. | 315/169.3 |
| 2005/0269959 | A1 | 12/2005 | Uchino et al. | |
| 2006/0113919 | A1 | 6/2006 | Childs et al. | |
| 2006/0119548 | A1 | 6/2006 | Lan et al. | |

(Continued)

FOREIGN PATENT DOCUMENTS

| | | | |
|---|---|---|---|
| JP | 2003/271095 | A | 9/2003 |
| JP | 2004-191603 | | 7/2004 |

(Continued)

*Primary Examiner* — Kimnhung Nguyen
(74) *Attorney, Agent, or Firm* — Global OLED Technology LLC

(57) ABSTRACT

Compensate for the variations of threshold voltage of a driving transistor. During the period of the reference signal voltage Vref being set to the signal line DTC, voltage between the gate and source of the driving transistor 10C is made equal to or greater than the threshold voltage of the driving transistor 10C, and the difference in voltage of the reference signal voltage Vref and the reference power supply voltage Vref_r is charged to the retentive capacitance 10B. At the same time, the voltage of the source of the said driving transistor 10C is set to the reference power supply voltage Vref_r to make the voltage applied to the light emitting element 10E equal to or lower than its threshold voltage, a voltage corresponding to the threshold voltage of the driving transistor 10C is held in the retentive capacitance 10B. During a period of time when a display signal voltage is set to the signal line DTC, the sampling transistor 10A is conducting, so as to sample the signal voltage, and this signal voltage is superposed on the threshold voltage held in the retentive capacitance.

6 Claims, 16 Drawing Sheets

(56) References Cited

U.S. PATENT DOCUMENTS

| | | | | |
|---|---|---|---|---|
| 2007/0296672 | A1* | 12/2007 | Kim et al. | 345/92 |
| 2008/0191976 | A1* | 8/2008 | Nathan et al. | 345/76 |
| 2009/0096725 | A1* | 4/2009 | Kretz et al. | 345/82 |
| 2009/0109142 | A1 | 4/2009 | Takahara | |
| 2009/0167647 | A1 | 7/2009 | Yamamoto et al. | |
| 2009/0207105 | A1* | 8/2009 | Hwang et al. | 345/76 |
| 2009/0213148 | A1* | 8/2009 | Takasugi | 345/690 |
| 2009/0262258 | A1 | 10/2009 | Taneda et al. | |
| 2010/0181630 | A1* | 7/2010 | Bu et al. | 257/410 |
| 2011/0050659 | A1* | 3/2011 | Tsai et al. | 345/205 |

FOREIGN PATENT DOCUMENTS

| | | | |
|---|---|---|---|
| JP | 2004/191603 | A | 7/2004 |
| JP | 2004-334204 | | 11/2004 |
| JP | 2005-285631 | | 10/2005 |
| JP | 2006-139079 | | 6/2006 |
| JP | 2008-052111 | | 3/2008 |
| JP | 2009-157019 | | 7/2009 |
| WO | WO 2004/088626 | A1 | 10/2004 |
| WO | 2009-087746 | | 7/2009 |

* cited by examiner

PIXEL CIRCUIT, DISPLAY DEVICE, AND INSPECTION METHOD

This application is a National Stage Entry of International Application No. PCT/US2010/055368, filed Nov. 4, 2010 and claims the benefit of Japanese Application No. 2009-257527, filed on Nov. 10, 2009, both of which are hereby incorporated by reference for all purposes as if fully set forth herein.

TECHNICAL FIELD

The present invention relates to a pixel circuit which drives light emitting elements using a driving transistor, a display device, and an inspection method.

BACKGROUND ART

With a display device that uses current drive type light emitting elements, such as an organic EL element (OLED), a driving transistor is normally arranged in a pixel circuit. A display is operated by driving the driving transistor based on display signals. However, because OLED is a current driven element, variable output current of the driving transistor is directly connected to a deterioration of visual quality. Therefore, a wide variety of proposals have been made to control variable driving current for example as in patent reference 1.

PRIOR ART REFERENCES

Patent References

[Patent reference 1] Japanese unexamined patent application No. 2003-271095

[Patent reference 2] Japanese unexamined patent application No. 2004-191603

GENERAL DESCRIPTION OF THE INVENTION

Problems to be Solved by the Invention

A switching transistor is used in the patent reference 1 to control the variation in the driving current, and the source electrode of this switching transistor and the cathode electrode of a light emitting element are common. Thus, the source electrode of the switching transistor is in an open state before the light emitting elements are formed and it is difficult to conduct an inspection in such case.

To conduct an inspection of pixels before the light emitting elements are formed has been proposed, for example, in patent reference 2. However, this patent reference 2 does not include a method of controlling variations in the driving current, and it is impossible to prevent deterioration of display quality as is.

Means for Solving the Problems

A pixel circuit according to the present invention comprises a sampling transistor which is connected to a signal line at one end and is turned on and off by the first scanning line; a driving transistor with a gate being connected to the other end of the sampling transistor and with a drain being connected to the first power supply; a light emitting element which is connected in between a source of the driving transistor and the second power supply and is driven by the current flowing through the said driving transistor; a retentive capacitance connected in between the gate and source of the said driving transistor; and a switching transistor which is arranged in between the source of the said driving transistor and a reference potential line and turned on and off by the second scanning line. The said sampling transistor and the said switching transistor are conducting during the period when a reference signal voltage is applied to the said signal line, the difference in voltage between the reference signal voltage and the reference potential is charged to the said retentive capacitance under the condition of the voltage between the gate and source of the said driving transistor being equal to or greater than the threshold voltage of the said driving transistor, and the source voltage of the said driving transistor is set to the reference potential in order to make the voltage applied to the said light emitting element equal to or lower than its threshold voltage. Subsequently, while a reference signal voltage is applied to the said signal line, the said sampling transistor and the said switching transistor are conducting and, by turning off the said switching transistor, the voltage equivalent to the threshold voltage of the said driving transistor is retained by the said retentive capacitance while maintaining the voltage applied to the said light emitting elements below its threshold voltage, and the said sampling transistor is electrically conducting to sample the said signal voltage during the period when the display signal voltage is applied to the said signal line, to superimpose the said signal voltage on the threshold voltage retained by the said retentive capacitance.

Also the present invention is a display device having a plurality of pixels arranged in a matrix, comprising a plurality of signal lines; a signal line driving circuit for driving the plurality of signal lines; a plurality of first scanning lines; a first scanning line driving circuit for driving these first scanning lines; a plurality of second scanning lines; a second scanning line driving circuit for driving these second scanning lines; and a reference potential line for supplying a reference potential. Each pixel comprises a sampling transistor, having one end connected to a signal line, and switched between on and off states by a first scanning line; a driving transistor with a gate connected to the other end of the sampling transistor and a drain connected to a first power supply; a light emitting element which is connected in between the source of the driving transistor and a second power supply and driven by the current flowing through the said driving transistor; a retentive capacitance connected between the gate and source of the said driving transistor; and a switching transistor which is arranged between the source of the said driving transistor and the reference potential line and switched between on and off states by a second scanning line. The said sampling transistor and the said switching transistor are electrically conducting during the period when a reference signal voltage is applied to the said signal line, the difference in voltage between the reference signal voltage and the reference potential is charged to the said retentive capacitance, with the voltage between the gate and source of the said driving transistor being equal to or greater than the threshold voltage of the said driving transistor, and the source voltage of the said driving transistor being set to the reference potential in order to make the voltage applied to the said light emitting element equal to or lower than its threshold voltage. Subsequently, while a reference signal voltage is applied to the said signal line, the said sampling transistor and the said switching transistor are electrically conducting and by turning off the said switching transistor, the voltage equivalent to the threshold voltage of the said driving transistor is retained by the said retentive capacitance while maintaining the voltage applied to the said light emitting elements equal to or lower than its threshold voltage, and the said sampling transistor is electrically conducting to sample the said signal voltage during the period when the display signal voltage is applied to the said signal line, to superimpose the said signal voltage on the threshold voltage retained by the said retentive capacitance.

Also, the said reference potential line is common to two rows of pixels and is preferably arranged in the row direction for every two rows of pixels.

Also, the said reference potential line is common to two columns of pixels and is preferably arranged in the column direction for every two columns of pixels.

It is preferred that the said reference potential lines are connected in a group outside of the display area where the said pixels are arranged.

It is preferred that a probe point which is connected to the said reference potential line is a probe point which can be probed by a probe from outside at least before the said light emitting elements are formed.

Also, it is preferred that the said second scanning line is common for two rows of pixels and arranged in the row direction per 2 rows of pixels.

Also, it is preferred that the current-voltage characteristic of the driving transistor is measured before the said light emitting elements are formed, by connecting a probe to the reference potential line, controlling the said sampling transistor and the on and off states of the switching transistor, and detecting current which flows out from the reference potential line.

Advantages of the Invention

According to the present invention, threshold voltage at which current starts to flow in the driving transistor is corrected in a pixel circuit, thereby making variations in the driving current small. Also, the cost reduction can be realized by not sending defective products to the next step, because pixels can be inspected before the said light emitting elements are formed.

MODE FOR CARRYING OUT THE INVENTION

An embodiment of the present invention will be explained based on the figures below.

Figure 1A:
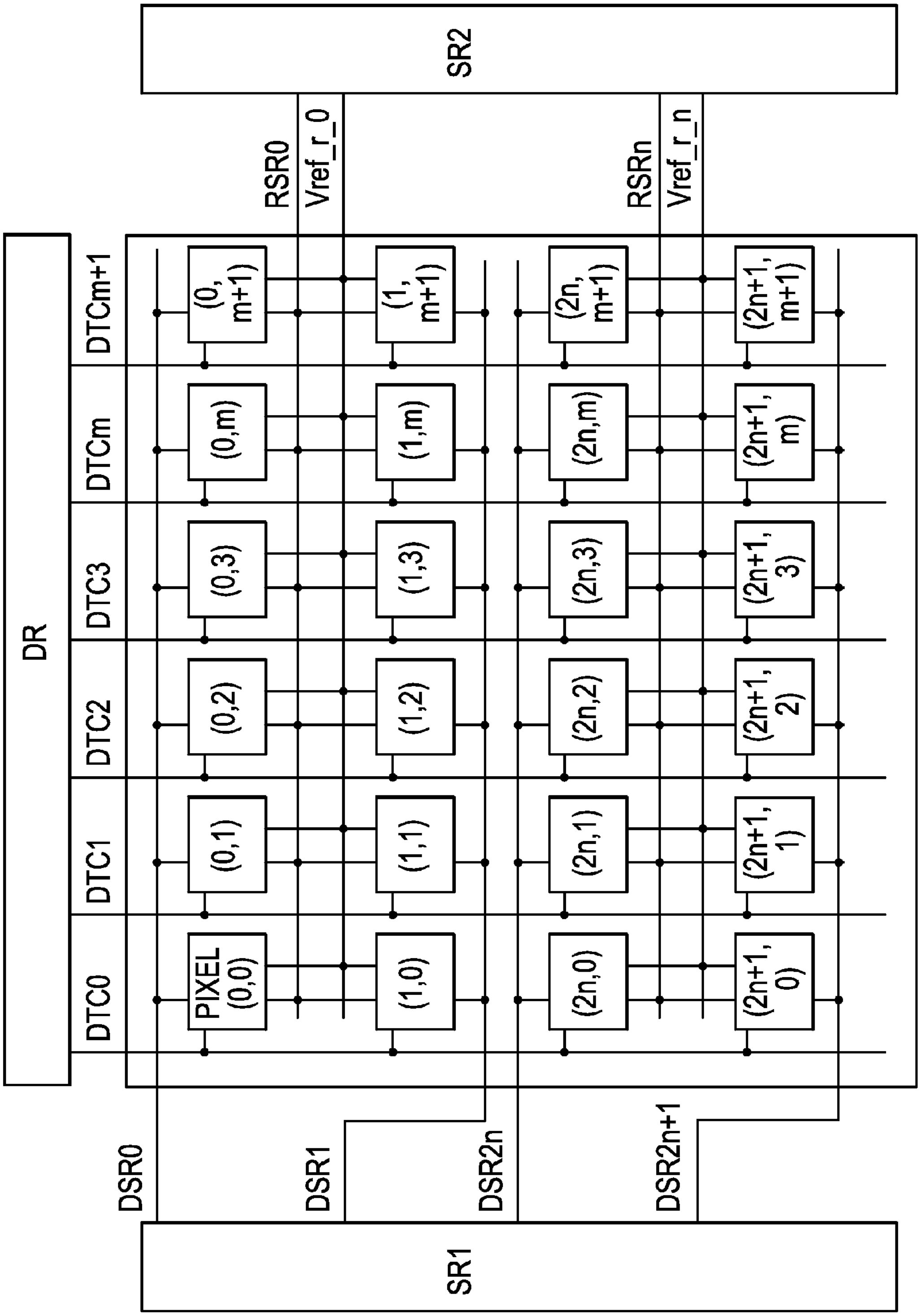
FIG. 1A is a block diagram of the present invention.

A block diagram of the entire display device according to the embodiment is indicated in FIG. 1A. As illustrated, pixels (0,0) to (2n+1, m+1) are arranged in a matrix in a display area. A signal line DTC is provided in the column direction for each column of pixels. A first scanning line DSR is provided for each row of pixels. Second scanning lines RSR and reference potential lines Vref_r are provided for each two rows of pixels. Two of the first scanning lines DSR are arranged in between two rows of pixels and are connected on both upper and lower sides to respective rows of pixels. The second scanning lines RSR and the reference potential lines Vref_r are arranged between rows of pixels where there is no first scanning line DSR arranged, and each is connected to upper and lower pixels.

Also, a signal line driving circuit DR for controlling the column direction signal lines, a first scanning line DSR in the row direction a first scanning line driving circuit SR1 for controlling the first scanning line DSR, and a second scanning line driving circuit SR2 for controlling a second scanning line RSR in the row direction are arranged outside the display section in which pixels (0,0) to (2n+1, m+1) are arranged. The second scanning line RSR and the reference potential line Vref_r are commonly connected to the pixels of two rows on upper and lower sides.

Figure 1B:
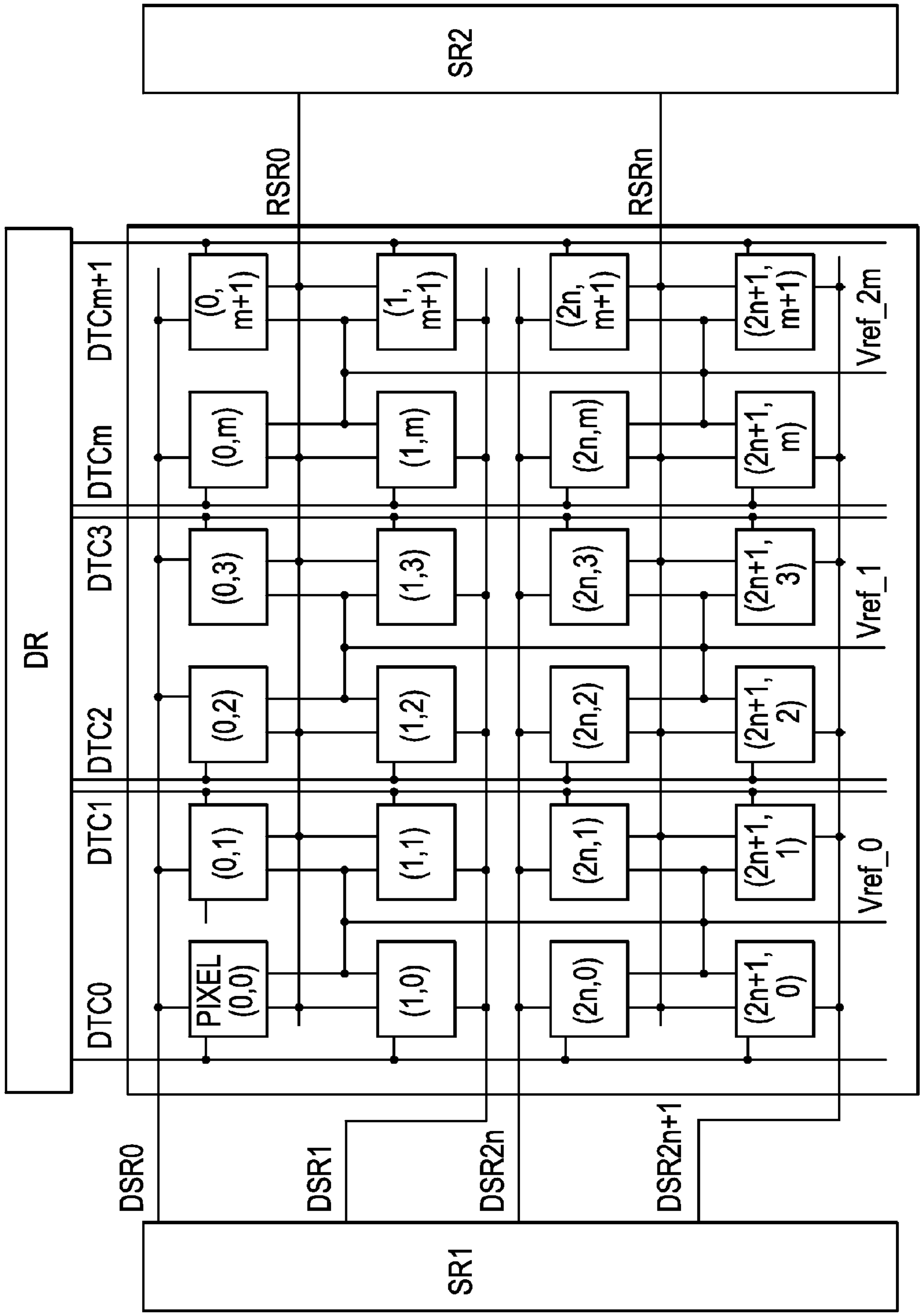
FIG. 1B is a block diagram of the present invention.

Also, the reference potential line Vref_r may be in a column direction. In this case, the reference potential line Vref_r is common for every two columns and connected to the pixels in left and right two columns. This configuration is indicated in FIG. 1B. Hereinafter, the reference potential line Vref_r in the row direction will be described.

Figure 2:
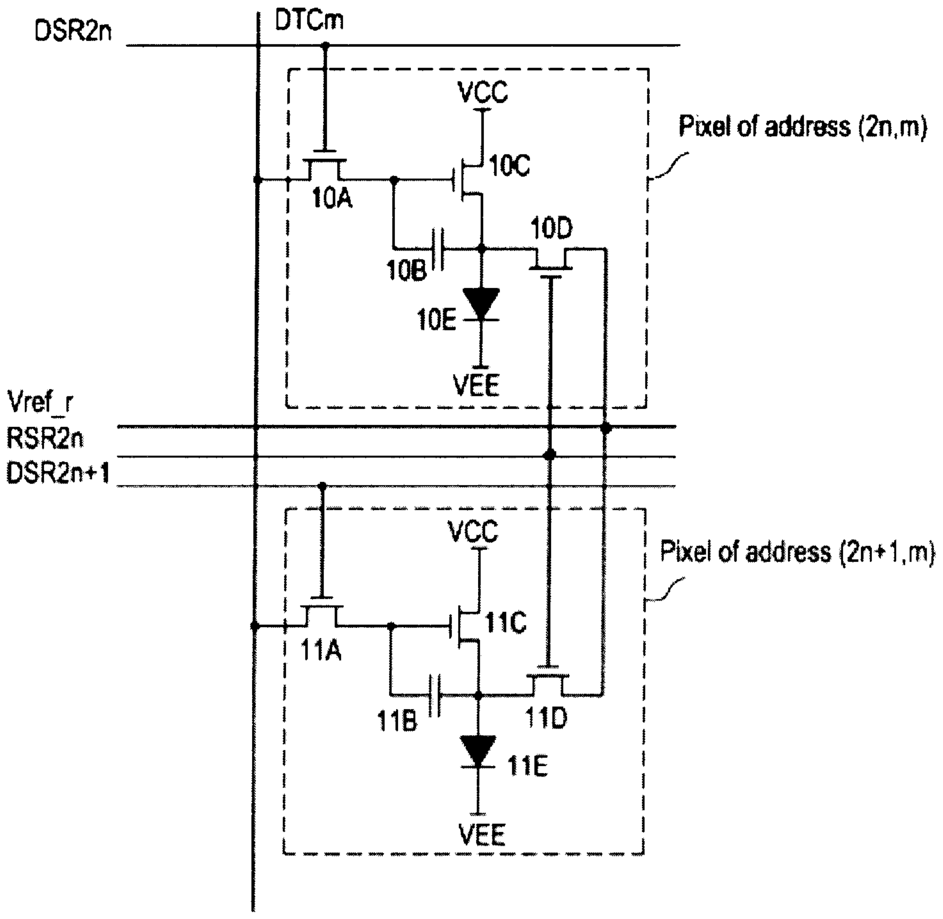
FIG. 2 is a pixel circuit of the present invention.

FIG. 2 shows the actual structure of a pixel circuit contained in the display device of FIG. 1. Since the second scanning lines RSR and the reference potential lines Vref_r are each shared by two rows, 2 pixels are illustrated in this figure. As shown in FIG. 2, this pixel circuit comprises a light emitting element 10E which emits light as a result of current flow, such as an OLED (organic EL element), a sampling transistor 10A, a driving transistor 10C, a switching transistor 10D, and a retentive capacitance 10B. A gate of the sampling transistor 10A is connected to the first scanning line DSR while one end is connected to the column direction signal line DTC and the other end is connected to the gate of the driving transistor 10C. The drain electrode of the driving transistor 10C is connected to the power supply VCC and the source electrode is connected to the anode of a current drive type light emitting element 10E such as an organic EL element. The cathode of the light emitting element 10E is connected to a cathode power supply VEE. Also, a retentive capacitance 10B is connected in between the gate of the driving transistor 10C and the source electrode. One end of a switching transistor 10D is connected in between the source of the driving transistor 10C and the anode of the light emitting element 10E, and the other end as well as the gate electrode are connected to the other end and the gate electrode of switching transistor 11D of the neighboring pixel.

In FIG. 2, the upper section is pixel 10, the lower section is pixel 11 and each element in the lower pixel is given symbols 11A to 11E.

FIG. 2 shows first scanning lines DSR arranged at a one-pixel spacing along a column, so that the number of lines in between pixels is 1, 3, . . . . Alternatively, first scanning lines DSR may be arranged at a two-pixel spacing as shown in FIGS. 1A, B as mentioned above.

Figure 3:
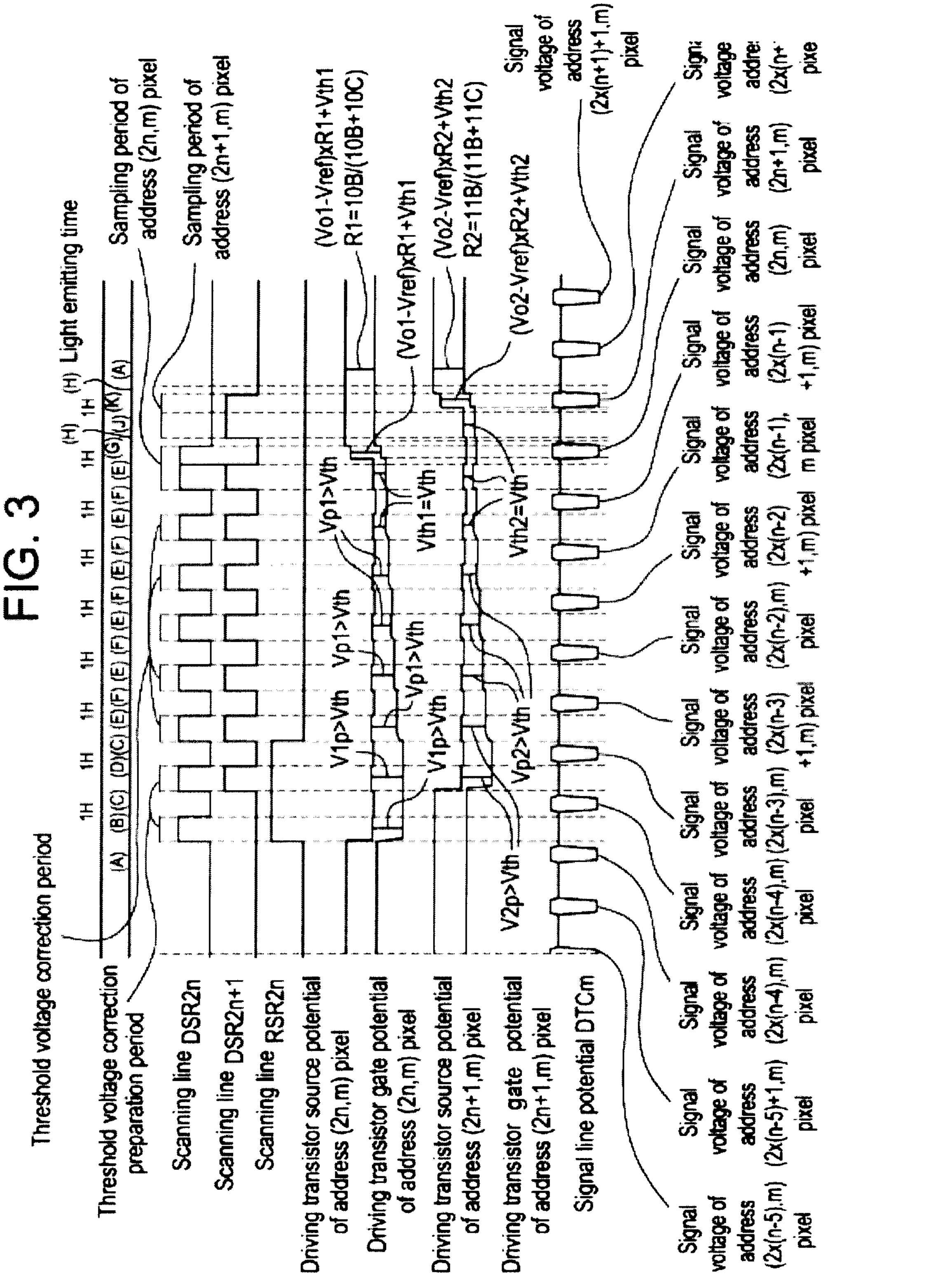
FIG. 3 shows operating waveforms of the present invention.

FIG. 3 indicates a timing chart. FIGS. 4A to 4K illustrate operations of each step.

Figure 4A:
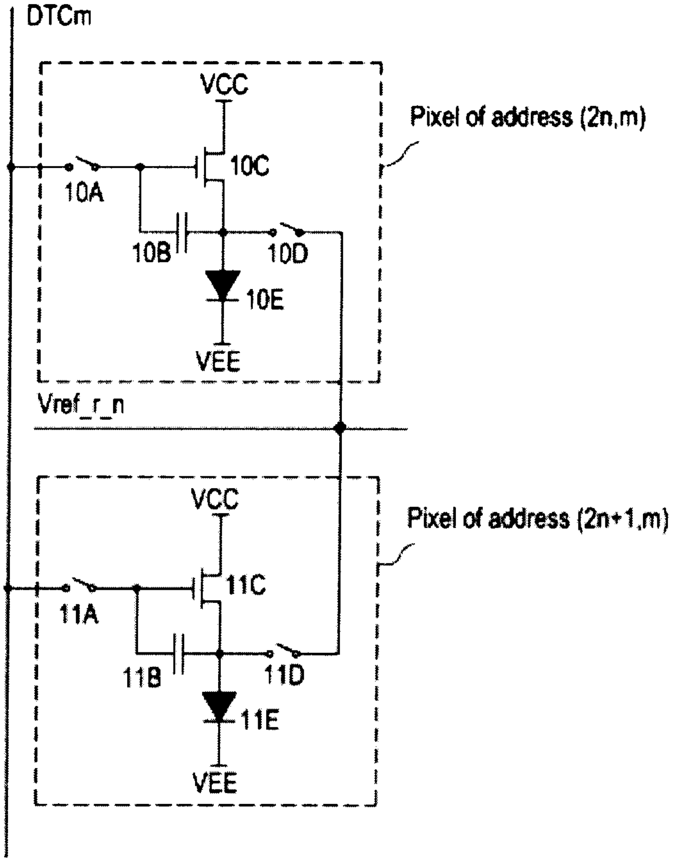
FIG. 4A is an explanatory diagram of the present invention.

FIG. 4A shows a light emitting period. Sampling transistors 10A, 11A and switching transistors 10D, 11D are turned off, while the light emitting elements 10E, 11E emit light as a result of the current which is supplied from the driving transistors 10C, 11C.

Figure 4B:
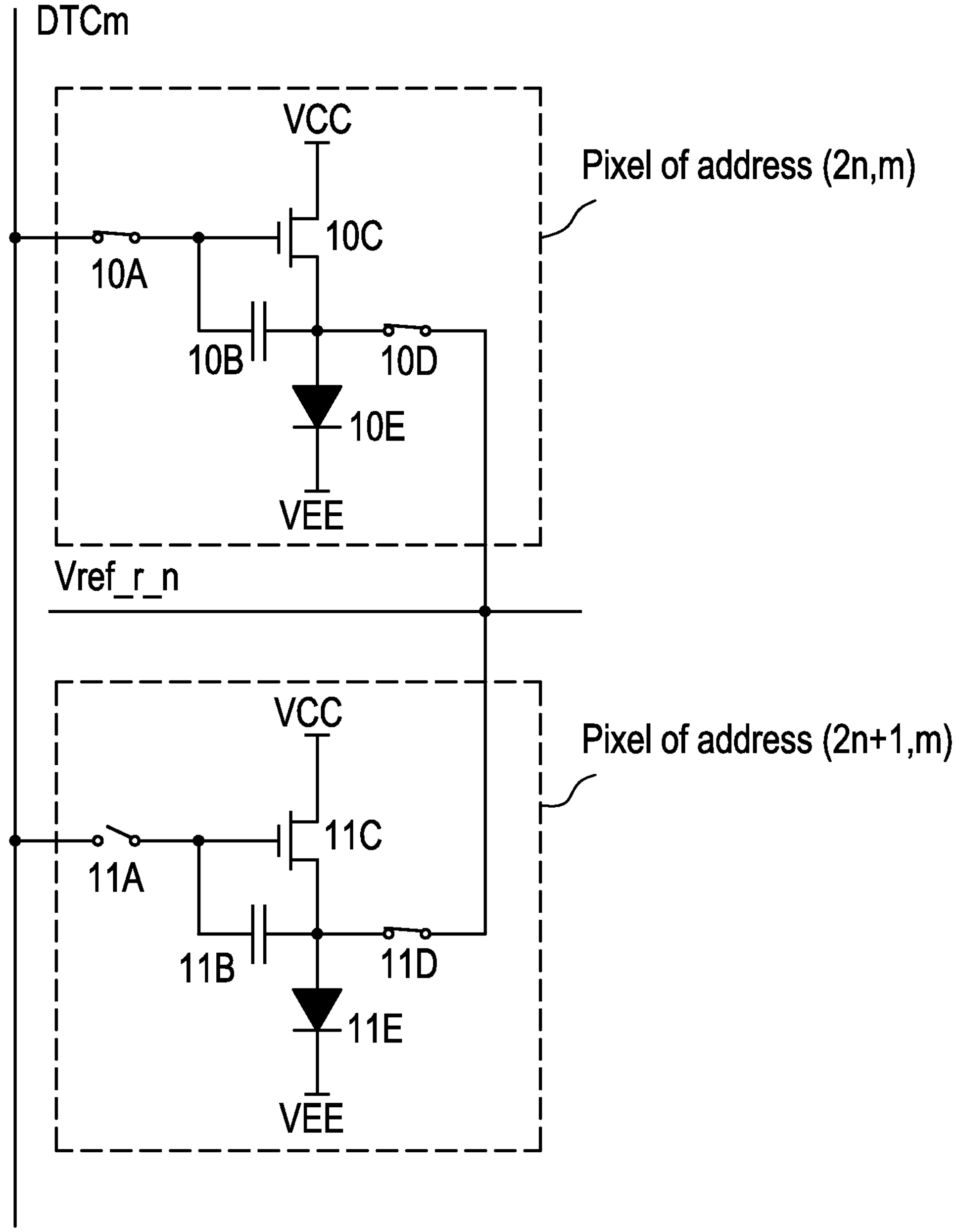
FIG. 4B is an explanatory diagram of the present invention.

FIG. 4B is a threshold detection period, and the sampling transistor 10A is made conductive by making the signal line DTCm a reference potential Vref with the first scanning line DSR being at H level. By doing so, the voltage of the gate electrode of the driving transistor 10C becomes Vref. Meanwhile, the voltage of the source electrode of the driving transistor 10C is made Vref_r by turning on the switching transistor 10D with the second scanning line RSR being at H level. The difference in voltage of Vref and Vref_r is made greater than the threshold voltage of the driving transistor 10C, and the voltage of the source electrode of the driving transistor 10C is made equal to or lower than the threshold voltage Vth_10E of the light emitting element 10E. That is, the following relationships are satisfied: Vgs_10C=Vref−Vref_r>Vth_10C, VEE+Vth_10E>Vref_r Consequently, although the driving transistor 10 is turned on, current is not applied to the light emitting element 10E. In the retentive capacitance 10B, Vgs_10C is retained.

Figure 4C:
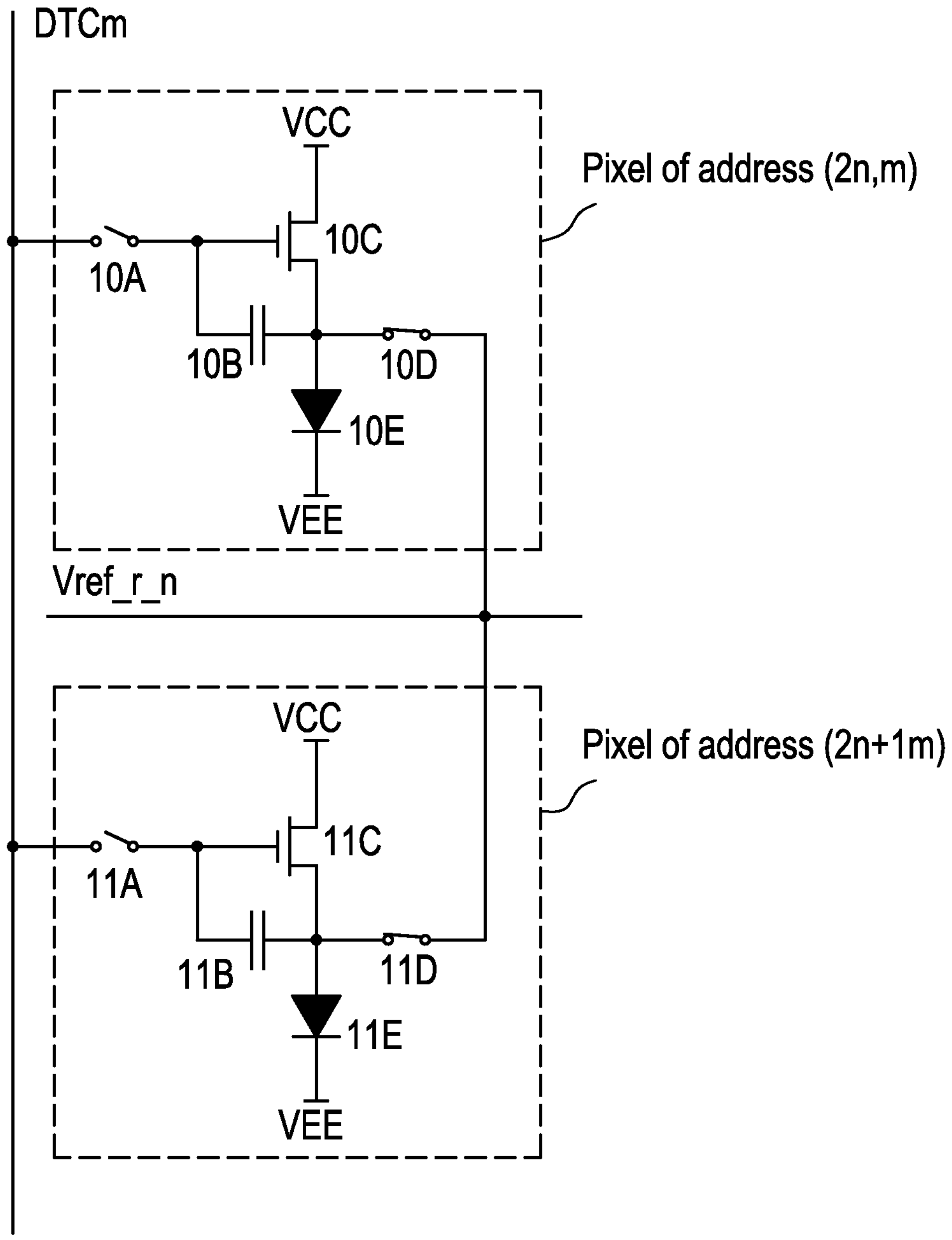
FIG. 4C is an explanatory diagram of the present invention.

FIG. 4C is a sampling period for 2×(n−4)th column and 2×(n−3)th column. It is therefore necessary to ensure that there is no impact on pixels of columns other than this. Therefore, the sampling transistors 10A and 11A are made non-conductive.

Figure 4D:
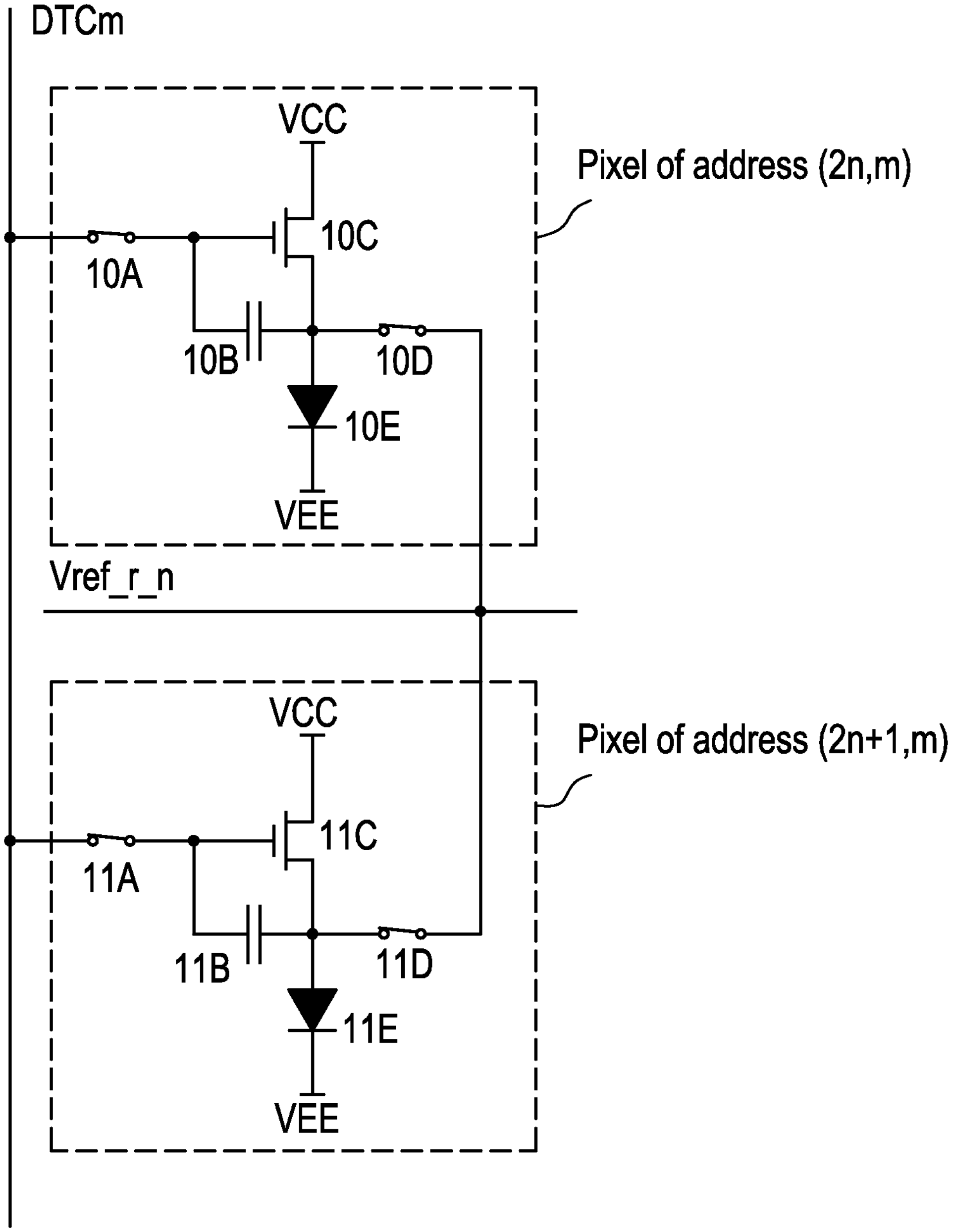
FIG. 4D is an explanatory diagram of the present invention.

FIG. 4D is a threshold detection preparation period for pixels. The signal line DTCm is set to the reference potential Vref, the sampling transistors 10A and 11A are made conductive, and so the gate electrodes of the driving transistors 10C and 11C are set to Vref. The switching transistors 10D, 11D are made conductive to make the voltage of Vgs_10C, Vgs_11C between the gate electrode and source electrode of the driving transistors 10C, 11C greater than the threshold voltage Vth_10C, Vth_11C and also to make the voltages applied to light emitting elements 10E, 11E equal to or lower than their threshold voltages.

This is expressed in the relationships below:

$$Vgs\_10C = Vref - Vref\_r > Vth\_10C \quad 1$$

$$Vgs\_11C = Vref - Vref\_r > Vth\_11C \quad 2$$

$$VEE + Vth\_10E > Vref\_r \quad 3$$

$$VEE + Vth\_11E > Vref\_r \quad 4$$

The second scanning line here is common per two lines, the pixel having address (2n, m) requires a threshold detection period longer by 1H than the pixel having address (2n+1, m). Also in FIG. 3, threshold detection period for the pixel having address (2n, m) is set to 1H, the pixel having address (2n+1, m) is set to 2H, but the steps should be repeated until the conditions of equation 1-4 are met. The retentive capacitance 10B and parasitic capacitance are discharged enough as to satisfy the above equations.

FIG. 4D is a threshold detection period for pixels. The signal line DTCm is set to the reference potential Vref, the sampling transistors 10A and 11A are made conductive, and so the gate electrodes of the driving transistors 10C and 11C are set to Vref. In order to detect threshold voltages of the driving transistors 10C, 11C, the switching transistors 10D, 11D are therefore made non-conductive. Consequently, the state is maintained with driving transistors 10C, 11C being on and no current flowing in the light emitting elements 10E, 11E, and the voltage Vgs between the gate electrode and the source electrode of the driving transistors 10C, 11C should be set to the threshold voltage of each transistor. The difference in voltage between Vref and Vref_r stored in the retentive capacitances 10B, 11B evolves towards the threshold voltage of each transistor.

Figure 4E:
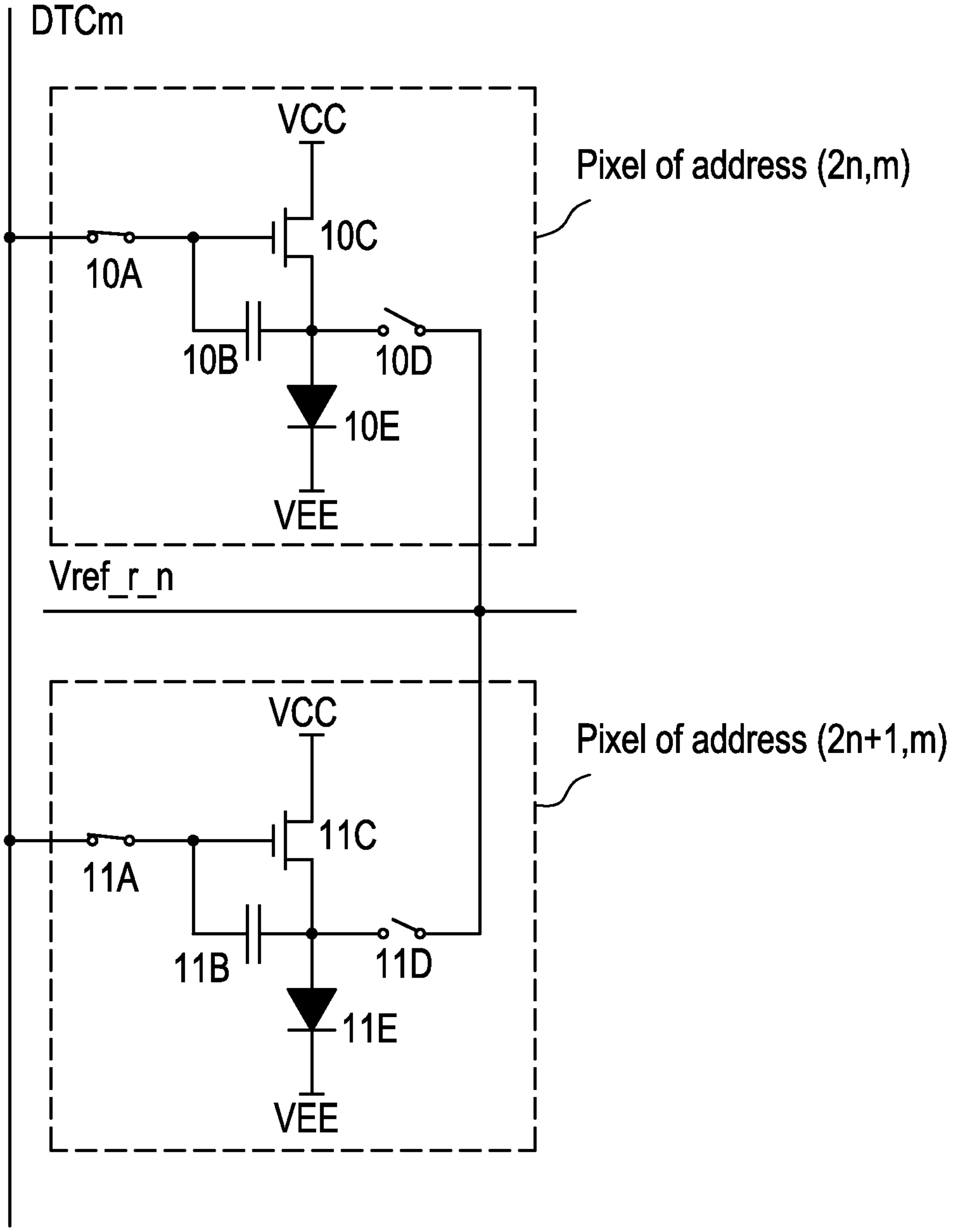
FIG. 4E is an explanatory diagram of the present invention.
Figure 4F:
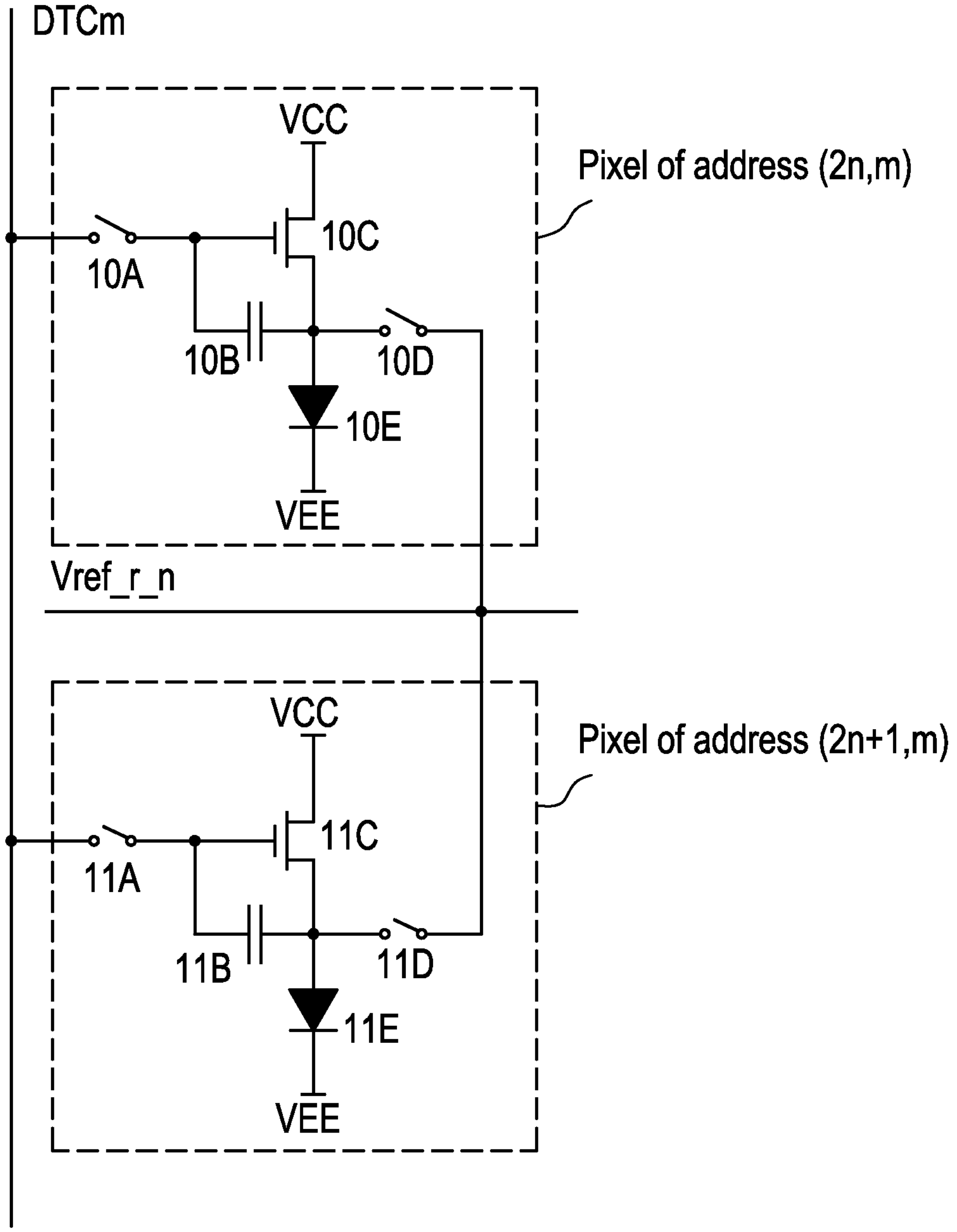
FIG. 4F is an explanatory diagram of the present invention.

FIG. 4F is a sampling preparation period of "F" steps: 2×(n−3)+1th row, 2×(n−2)th row, 2×(n−2)+1th row, 2×(n−1)th row and 2×(n−1)+1th row. It is therefore necessary to ensure that there is no impact on pixels of rows other than these. The sampling transistors 10A and 11A are therefore made non-conductive. In this period the voltage of the previous threshold detection period is retained for each electrode.

The process of FIGS. 4E and 4F is repeated until the voltage Vgs between the gate electrode and the source electrode of the driving transistor becomes the threshold voltage Vth. In the figures, it is repeated 5 times. At this time, the voltage Vs of the source electrode of the driving transistors 10C, 11C are as below:

$$Vs\_10C = Vref - Vth\_10C \quad 5$$

$$Vs\_11C = Vref - Vth\_11C \quad 6$$

Therefore, Vth_10C, Vth_11C are held in the retentive capacitances 10B, 11B respectively.

Also at this time, the voltages applied to the light emitting elements 10E, 11E must be less than the threshold voltages Vth_10E, Vth_11E. That is, the following relationships must be satisfied:

$$VEE + Vth\_10E > Vs\_10C \quad 7$$

$$VEE + Vth\_11E > Vs\_11C \quad 8$$

For column 2n, Vref must satisfy formula 9 which is obtained from formulae 5 and 7, and Vref_r must satisfy equation 1.

$$VEE + Vth\_10E + Vth\_10C > Vref \quad 9$$

Figure 4G:
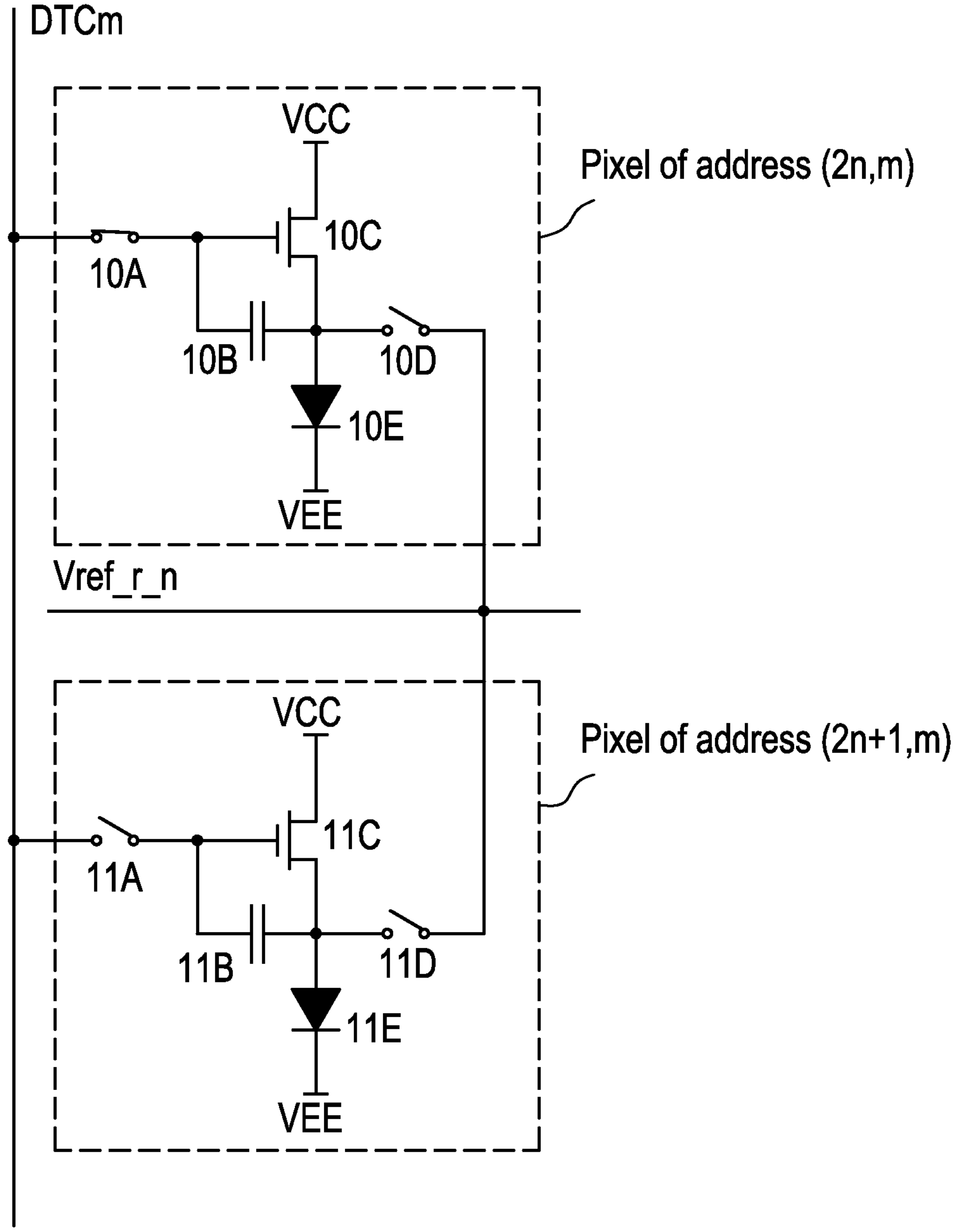
FIG. 4G is an explanatory diagram of the present invention.

FIG. 4G is a sampling period for sampling signal voltage Vsig0 by setting the signal line to a desired signal voltage Vsig0 and making the sampling transistor 10A conductive. The gate electrode potential of the driving transistor 10C changes from Vref to Vsig0.

At this time, the source electrode voltage of the driving transistor 10C becomes:

$$Vs\_10C = Vref - Vth\_10C + (Vsig0 - Vref) \times Cap\_10E / (Cap\_10B + Cap\_10E) + VEE \times Cap\_10B / (Cap\_10B + Cap\_10E) = \{Cap\_10B \times (VEE + Vref + Cap\_10E \times Vsig0\} / (Cap\_10B + Cap\_10E) - Vth\_10C$$

The voltage between the gate electrode and source electrode becomes:

$$Vgs\_10C = Cap\_10B / (Cap\_10B + Cap\_10E)(Vsig0 - VEE - Vref) + Vth\_10C$$

Figure 4H:
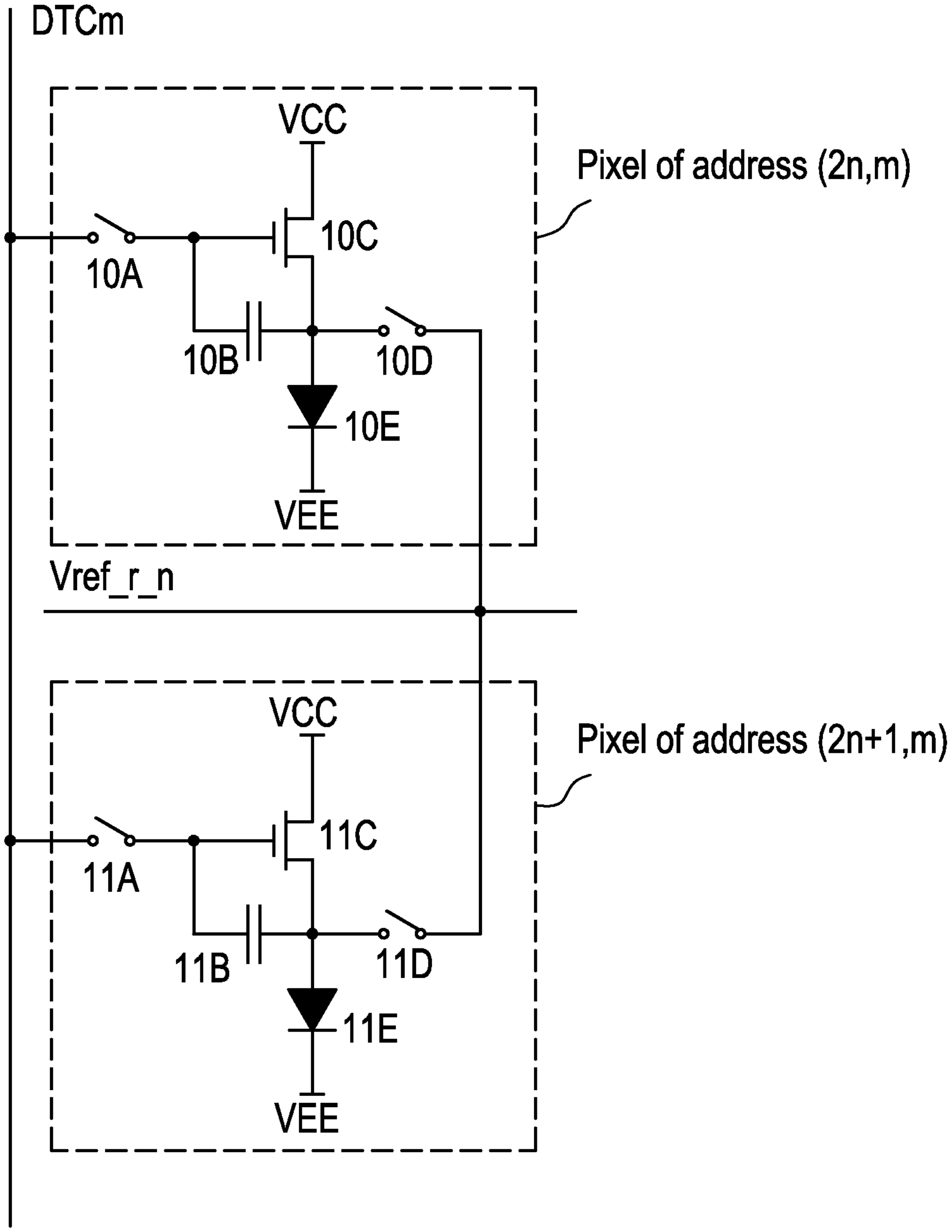
FIG. 4H is an explanatory diagram of the present invention.

In FIG. 4H, the sampling transistors 10A, 11A are non-conductive, and therefore the potential of the previous step is retained for each electrode.

Figure 4J:
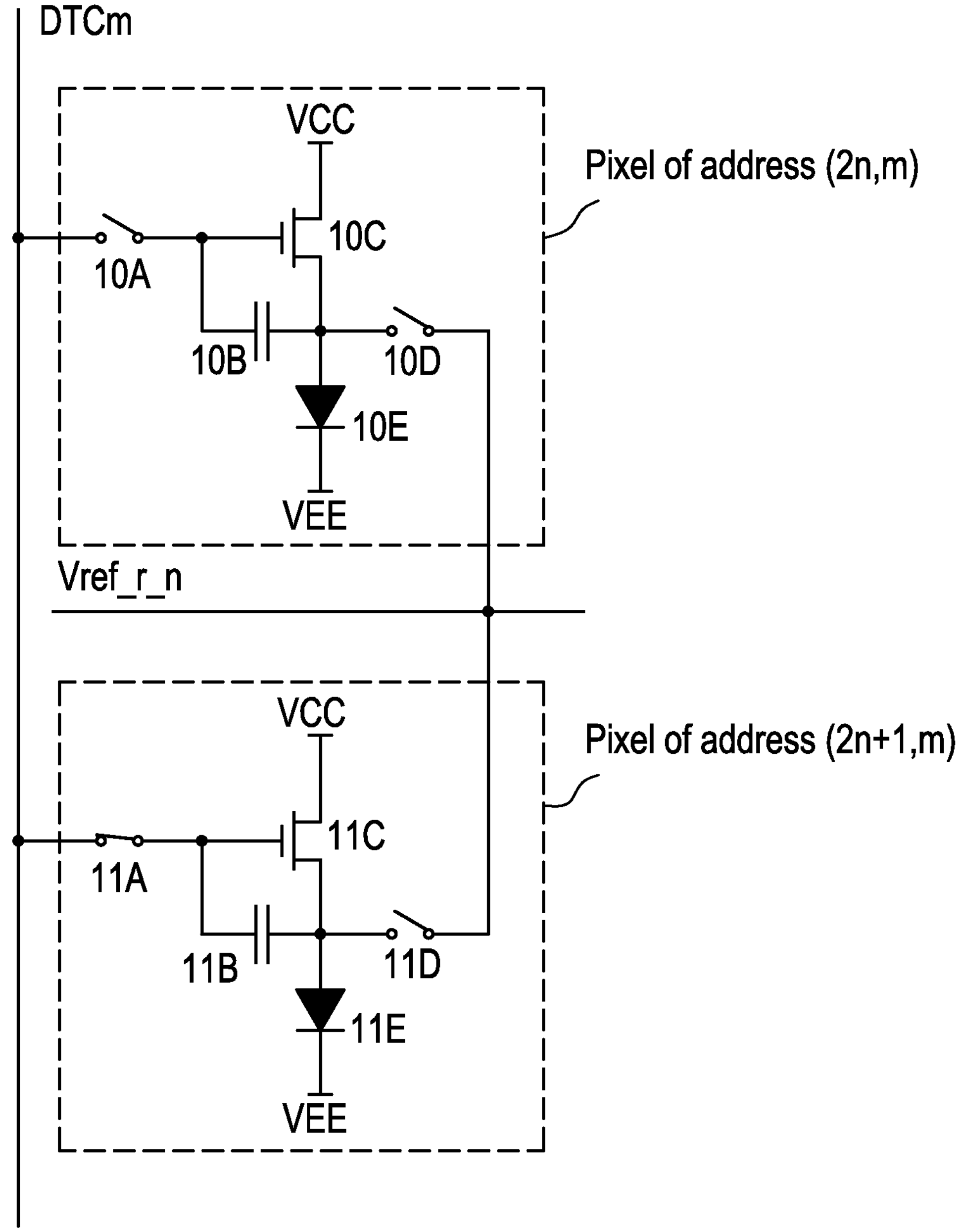
FIG. 4J is an explanatory diagram of the present invention.

FIG. 4J is the final threshold detecting period of 2n+1th column, and the sampling transistor 10A is made non-conductive while 11A is conductive.

Figure 4K:
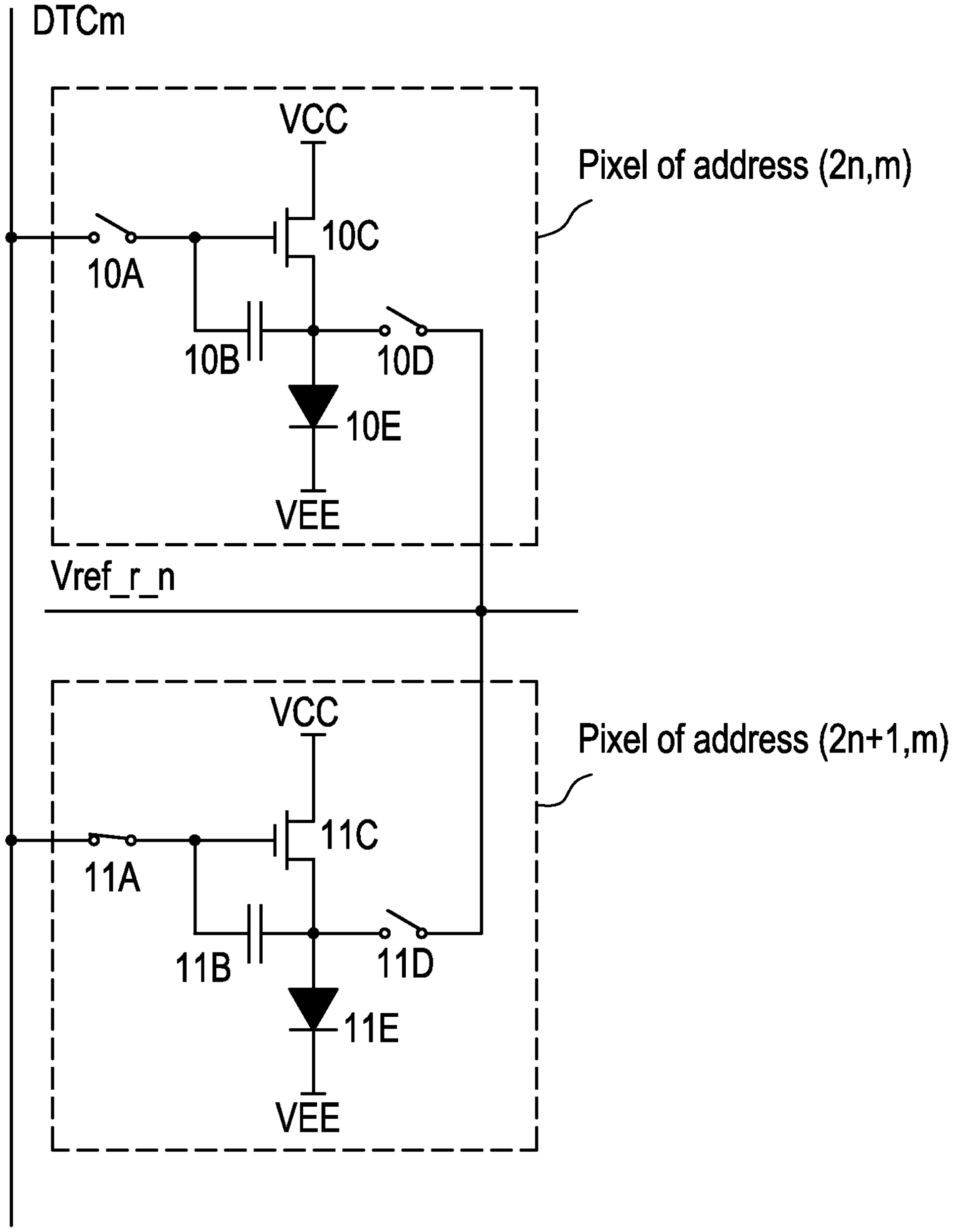
FIG. 4K is an explanatory diagram of the present invention.

FIG. 4K is a sampling period for sampling signal voltage Vsig1 by setting the signal line to a desired signal voltage Vsig1 and sampling Vsig1 with the sampling transistor 11A. The gate electrode potential of the driving transistor 11C changes from Vref to Vsig1.

At this time, the source electrode of the driving transistor 11C becomes:

$$Vs\_11C = Vref - Vth\_11C + (Vsig0 - Vref) \times Cap\_11E / (Cap\_11B + Cap\_11E) + VEE \times Cap\_11B / (Cap\_11B + Cap\_11E)$$

The voltage between the gate electrode and source electrode becomes:

$$Vgs\_11C = Cap\_11B / (Cap\_11B + Cap\_11E) \times (Vsig0 - VEE - Vref) + Vth\_11E$$

A characteristic formula for Ids of a driving transistor is expressed by $Ids=\beta/2(Vgs-Vth)^2$. If Vgs_10C and Vgs_11C are respectively input, the formula becomes:

$$Ids0=\beta/2\times\{Cap\_10B/(Cap\_10B+Cap\_10E)\times(Vsig0-VEE-Vref)\}^2$$

$$Ids1=\beta/2\times\{Cap\_11B/(Cap\_11B+Cap\_11E)\times(Vsig1-VEE-Vref)\}^2$$

The term Vth is corrected, and variations in drive current can be suppressed.

Figure 5A:
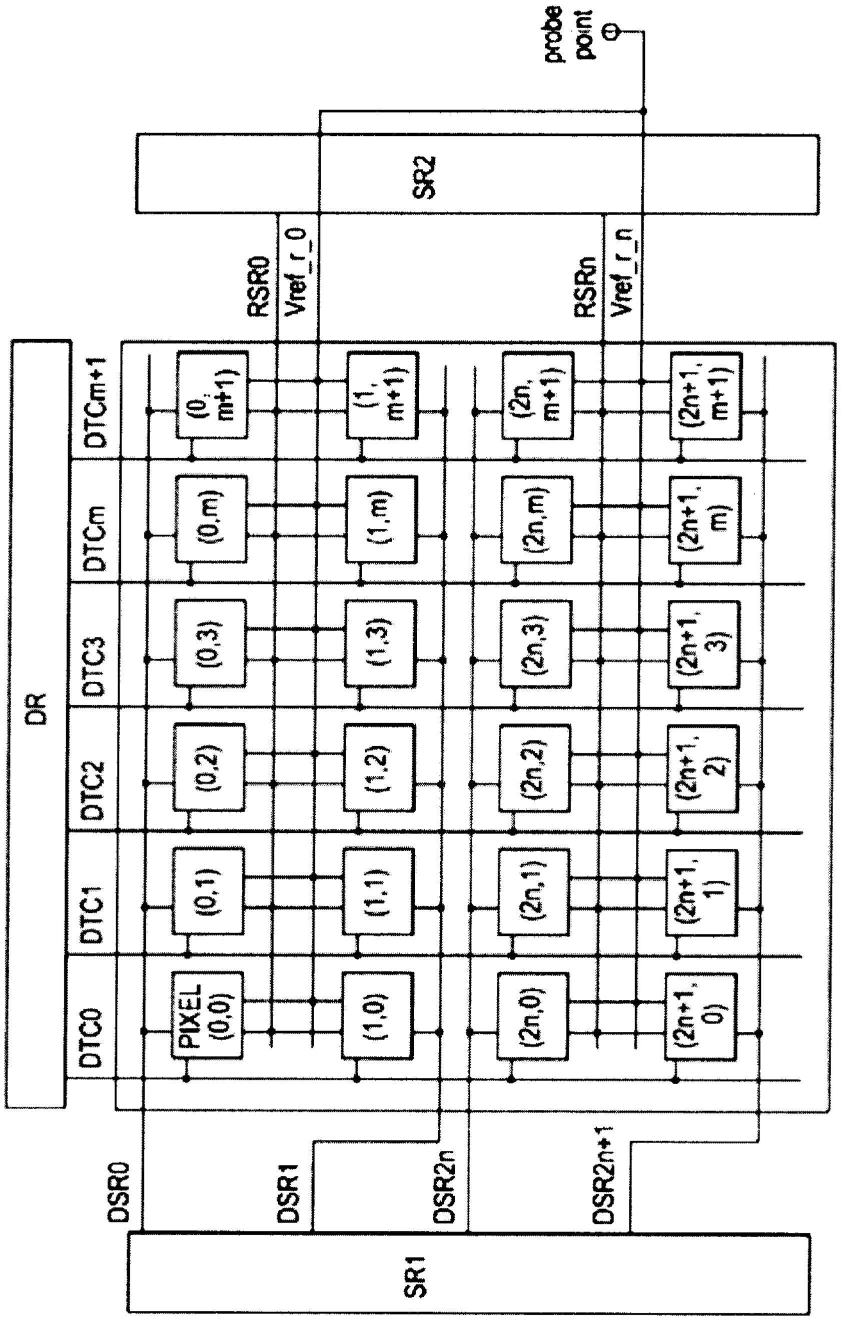
FIG. 5A is a block diagram of the present invention.

FIG. 5A is an overall view of checking failures in transistors, driving transistors, and switching transistors by sampling a signal level before light emitting elements are formed. The reference potential lines Vref_r are terminated outside of a display area and a certain number of lines are connected in a group. The number of the reference potential lines Vref_r to be connected together is determined considering the number of current measuring devices, measurement time, and S/N ratio. In the figure, Vref_r_0 and Vref_r_n are connected together. And to one end of the connected reference potential line Vref_r, a probe point for measurement is formed.

Figure 5B:
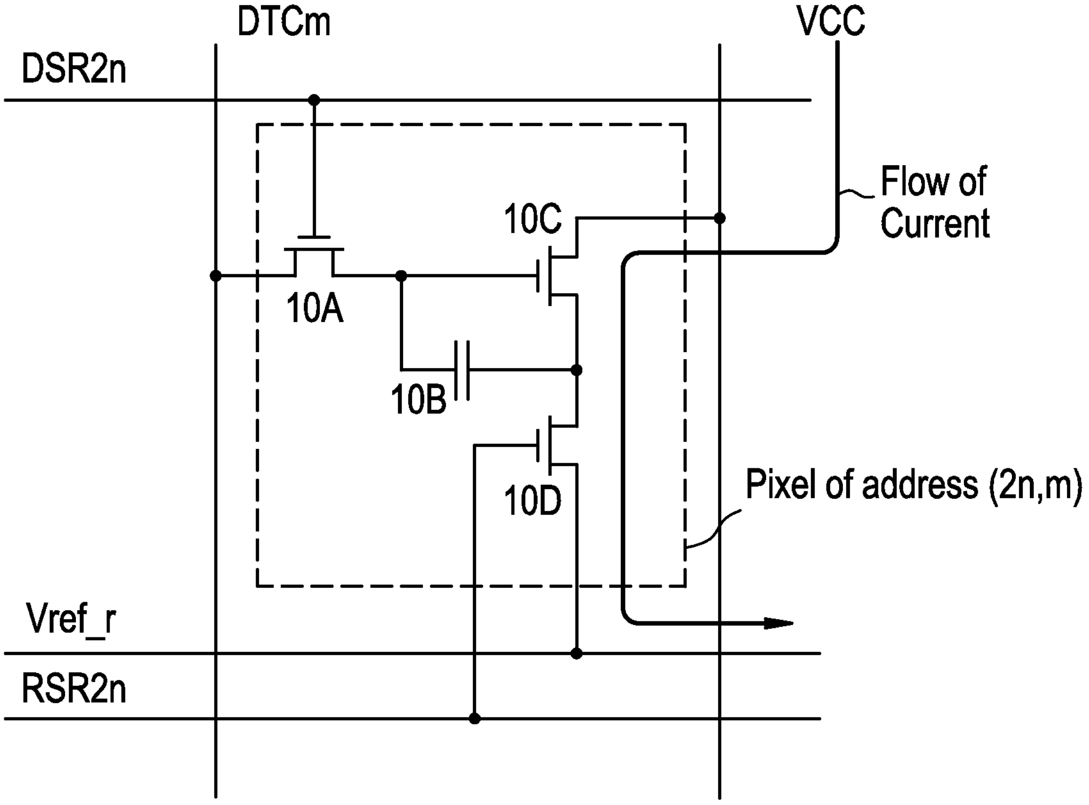
FIG. 5B is an explanatory diagram of the present invention.

FIG. 5B indicates a pixel circuit before light emitting element 10E is formed, when checking failures in sampling transistor 10A, driving transistor 10C, and switching transistor 10D by sampling a signal level before light emitting elements are formed. That is, when the light emitting element 10E is formed, the source of the driving transistor 10C is connected to the anode of the light emitting elements 10E, but this connection does not exist before the light emitting element 10E is formed.

The sampling transistor 10A and the switching transistor 10D are made conductive and the signal potential is given to the gate electrode of the driving transistor 10C from the signal line DTCm. At this time, the current which flows between the drain electrode and source electrode of the driving transistor 10C is measured at the probe point connected to Vref_r to check failures. That is, the second scanning line RSR is set to H level and the first scanning line DSR is sequentially made H level. By doing so, the sampling transistors 10A of corresponding pixel are turned on, the potential of the signal line DTC is brought into a pixel, a corresponding current flows, and the current flowing from the probe point to an external ground is measured using a measuring device to confirm operation of pixel circuit.

In particular, I-V characteristics including threshold voltage of the driving transistor 10C in one pixel circuit can be detected.

Also, by turning on the signal line DTC one by one, inspection of pixels can be conducted one by one, but failure in an element can be detected even when inspecting a group of pixels.

Although an n-channel transistor is used in the embodiment above, p-channel transistor may also be used. When a p-channel transistor is used as the driving transistor 10C, the source electrode is arranged on the power supply VCC side and the light emitting element 10E and the retentive capacitance 10B are also arranged on the power supply VCC side.

According to the embodiment of this display device, the threshold voltage at which current starts to flow in the driving transistor is corrected in each pixel circuit to make variations in the driving current small. Before light emitting elements are formed, pixels can be inspected to check for faults in sampling transistors, driving transistors, and switching transistors. Consequently, by not sending defective products to the next step, cost reduction is realized.

DESCRIPTION OF THE SYMBOLS

10, 11 pixels, 10A, 11A sampling transistors, 10B, 11B retentive capacitances, 10C, 11C driving transistors, 10D, 11D switching transistors, 10E, 11E light emitting elements.

The invention claimed is:

1. A pixel circuit comprising:

a sampling transistor having a gate electrode controlled by a first scanning line and a second electrode connected to a signal line;

a driving transistor having a gate electrode connected to a third electrode of the sampling transistor and a drain electrode connected to a first power supply line;

a light emitting element connected between a source electrode of the driving transistor and a second power supply line and driven by current supplied from the driving transistor;

a storage capacitor connected between the gate and source electrodes of the driving transistor; and a switching transistor having a gate electrode controlled by a second scanning line, a second electrode connected to the source electrode of the driving transistor, and a third electrode connected to a reference potential line;

wherein the pixel circuit is operable in a first phase with (i) the switching transistor switched on, so that the voltage applied across the light emitting element is less than or equal to a threshold voltage of the light emitting element, (ii) a reference signal voltage applied on the signal line, and (iii) the sampling transistor switched on, so that the voltage applied across the storage capacitor is greater than or equal to a threshold voltage of the driving transistor;

the pixel circuit is operable in a second phase with (i) the switching transistor switched off, (ii) the reference signal voltage applied on the signal line, and (iii) the sampling transistor switched on, whereby current through the driving transistor changes the voltage of the source electrode of the driving transistor, whereby the voltage applied across the storage capacitor approaches the threshold voltage of the driving transistor, while the voltage applied across the light emitting element is less than or equal to the threshold voltage of the light emitting element;

the pixel circuit is operable in a third phase with (i) the switching transistor switched off, (ii) a display signal voltage applied on the signal line, and (iii) the sampling transistor switched on, whereby the display signal voltage is superimposed on a voltage applied across the storage capacitor prior to commencement of the third phase; and wherein the reference potential line is connected to a test point that is operable to connect to a probe for measuring current through the driving transistor prior to formation of the light emitting element.

2. The pixel circuit of claim 1, wherein the pixel circuit is operable in the first phase, the second phase and the third phase in that order.

3. The pixel circuit of claim 2, wherein the pixel is operable to repeat the second phase a plurality of times, successive repetitions being separated by time intervals in which both the switching transistor and the sampling transistor are off.

4. A display device having a plurality of pixels arranged in a matrix, comprising:

a plurality of signal lines;

a signal line driving circuit for driving the plurality of signal lines;

a plurality of first scanning lines;

a first scanning line driving circuit for driving the first scanning lines;

a plurality of second scanning lines;

a second scanning line driving circuit for driving the second scanning lines;

a reference potential line for supplying reference potential; and each pixel further comprising:

a sampling transistor having a gate electrode controlled by a third scanning line from among the plurality of first scanning lines and a second electrode connected to a first signal line from among the plurality of signal lines;

a driving transistor having a gate electrode connected to a third electrode of the sampling transistor and a drain electrode connected to a first power supply line;

a light emitting element connected between a source electrode of the driving transistor and a second power supply line and driven by current supplied from the driving transistor;

a storage capacitor connected between the gate and source electrodes of the driving transistor; and a switching transistor having a gate electrode controlled by a fourth scanning line from among the plurality of second scanning lines, a second electrode connected to the source electrode of the driving transistor, and a third electrode connected to the reference potential line;

wherein each pixel is operable in a first phase with (i) the switching transistor switched on, so that the voltage applied across the light emitting element is less than or equal to a threshold voltage of the light emitting element, (ii) a reference signal voltage applied on the first signal line, and (iii) the sampling transistor switched on, so that the voltage applied across the storage capacitor is greater than or equal to a threshold voltage of the driving transistor;

each pixel is operable in a second phase with (i) the switching transistor switched off, (ii) the reference signal voltage applied on the first signal line, and (iii) the sampling transistor switched on, whereby current through the driving transistor changes the voltage of the source electrode of the driving transistor, whereby the voltage applied across the storage capacitor approaches the threshold voltage of the driving transistor, while the voltage applied across the light emitting element is less than or equal to the threshold voltage of the light emitting element;

the pixel circuit is operable in a third phase with (i) the switching transistor switched off, (ii) a display signal voltage applied on the first signal line, and (iii) the sampling transistor switched on, whereby the display signal voltage is superimposed on a voltage applied across the storage capacitor prior to commencement of the third phase; and wherein the reference potential line is connected to a test point outside the matrix of pixels that is operable to connect to a probe for measuring current through the driving transistors of one or more pixels prior to formation of the light emitting elements.

5. A display device having a plurality of pixels arranged in a matrix of rows and columns, comprising:

a plurality of signal lines;

a signal line driving circuit for driving the plurality of signal lines;

a plurality of first scanning lines;

a first scanning line driving circuit for driving the first scanning lines;

a plurality of second scanning lines;

a second scanning line driving circuit for driving the second scanning lines;

a reference potential line for supplying reference potential; and each pixel further comprising:

a sampling transistor having a gate electrode controlled by a third scanning line from among the plurality of first scanning lines and a second electrode connected to a first signal line from among the plurality of signal lines;

a driving transistor having a gate electrode connected to a third electrode of the sampling transistor and a drain electrode connected to a first power supply line;

a light emitting element connected between a source electrode of the driving transistor and a second power supply line and driven by current supplied from the driving transistor;

a storage capacitor connected between the gate and source electrodes of the driving transistor; and a switching transistor having a gate electrode controlled by a fourth scanning line from among the plurality of second scanning lines, a second electrode connected to the source electrode of the driving transistor, and a third electrode connected to the reference potential line;

wherein each pixel is operable in a first phase with (i) the switching transistor switched on, so that the voltage applied across the light emitting element is less than or equal to a threshold voltage of the light emitting element, (ii) a reference signal voltage applied on the first signal line, and (iii) the sampling transistor switched on, so that the voltage applied across the storage capacitor is greater than or equal to a threshold voltage of the driving transistor;

each pixel is operable in a second phase with (i) the switching transistor switched off, (ii) the reference signal voltage applied on the first signal line, and (iii) the sampling transistor switched on, whereby current through the driving transistor changes the voltage of the source electrode of the driving transistor, whereby the voltage applied across the storage capacitor approaches the threshold voltage of the driving transistor, while the voltage applied across the light emitting element is less than or equal to the threshold voltage of the light emitting element;

the pixel circuit is operable in a third phase with (i) the switching transistor switched off, (ii) a display signal voltage applied on the first signal line, and (iii) the sampling transistor switched on, whereby the display signal voltage is superimposed on a voltage applied across the storage capacitor prior to commencement of the third phase; and wherein the second scanning lines are arranged in the row direction, the switching transistors for two adjacent rows of pixels are operable to be turned on and off at the same times, and one second scanning line is shared by these two rows.

6. The display device of claim 5, wherein the reference potential line is connected to a test point outside the matrix of pixels that is operable to connect to a probe for measuring current through the driving transistors of one or more pixels prior to formation of the light emitting elements.

* * * * *